May 18, 1965 R. MARCUCCI ETAL 3,184,242

RECORDING STYLUS

Filed April 19, 1963 2 Sheets-Sheet 1

INVENTORS
ISABEL CAPPS RAINEY
RICHARD MARCUCCI

BY Darby & Darby

ATTORNEYS

May 18, 1965 R. MARCUCCI ETAL 3,184,242

RECORDING STYLUS

Filed April 19, 1963 2 Sheets-Sheet 2

INVENTORS
ISABEL CAPPS RAINEY
RICHARD MARCUCCI
BY Darby & Darby
ATTORNEYS 3,184,242

RECORDING STYLUS

Richard Marcucci and Isabel Capps Rainey, Brooklyn, N.Y., assignors to Capps & Co., Inc., Valley Stream, N.Y., a corporation of New York Filed Apr. 19, 1963, Ser. No. 274,262
4 Claims. (Cl. 274—38)

This invention relates to sound recording systems and more particularly to an improved recording stylus.

In making a disc type sound recording, the stylus is used to engrave a plurality of grooves, which contains the sound information, in a master record. This master is normally made of wax, lacquer, shellac or other suitable plastic material which can be readily cut by the stylus. The master is then used to make a master metallic pressing blank or matrix from which is made a number of other pressing blanks which are actually used for the production of the end product records. A large number of records of a plastic material such as Vinylite are then made from each pressing blank. This is commonly done by the simple expedient of placing a quantity of the Vinylite or other plastic material called a "bisquit," on the pressing blank and pressing the material against the blank to form the record to harden. In some cases injection molding techniques are used.

In order to cut the original master, both a cutting (recording) head and a stylus are used. The cutting head is supplied with electrical signals corresponding to the sounds to be recorded and it drives the stylus in a predetermined manner to cut the grooves in the master record. The grooves cut in the record by the stylus may be of any predetermined pattern, such as lateral, hill and dale and the so-called 45°–45° Westrex stereo system. In the latter two types of systems the stylus is moved vertically with respect to the master. All of these groove types are well known in the art as are the respective cutting heads for making them.

All of the materials used for master records have inherent strain and tension properties so that when the stylus cuts a groove in the record the record material around the groove will shrink. The inherent forces of the record material are therefore capable of causing irregularities in the groove and on the record surface since these forces are not equal over the entire record. Also, as the stylus cuts a groove in the master, an amount of material is removed which varies in accordance with the cutting depth to which the stylus is driven by the cutting head. Thus, the record material is disturbed to a greater extent as the stylus cuts deeper and the stylus itself may cause record groove and surface irregularities as it cuts away the record material.

The grooves cut into the master, and hence the groove of the end product records, are preferably made to have a desired shape which is to be held within certain dimensional, angular, and structural limits. These limts are set by standards generally agreed upon by the industry so that reproducing cartridges and their styli can be designed to properly track in a groove and thereby recover and reproduce all of the information faithfully, with a minimum amount of noise and distortion. Because of the forces encountered by the stylus as it cuts the material from the master record and the forces in the record material itself, the grooves of the end product pressed record do not always conform exactly to the desired shape. For example, if a V-shaped groove is desired on the end product record, then a stylus having a V-shape cutting surface would be used. Because of the various forces the V-shaped cutting face of the stylus will not always cut a correspondingly exact V-shaped groove. Instead, the grooves will have irregularities and flaws such as having portions of the side walls torn away, concave side walls, weaknesses in the record surface material between grooves, etc. Therefore, the grooves of the end product records will not have the exact desired V-shape but will also have the same irregularities and flaws.

When pressing blanks are made from the master record and the end product records from the pressing blank the irregularities on the original master cause several adverse effects. For example, the surface irregularities in the intersections between the grooves and record surface, known in the trade as "horns," adversely affect the separation of both the pressing blanks from the master record and the end product records from the pressing blanks. It should be clear that when "horns" are present on the master they will result in irregularities or "horns" in the material of the pressing blank around the V-shaped grooves. These horns will tend to stick together so that the pressing blank cannot be cleanly and easily separated from the master. The same unwanted effect will occur during the separation of the end product records from the pressing blanks since the same surface irregularities are present on the pressing blank. In some cases the horns on the pressing blanks will result in the further tearing away of material from the groove walls of the end product record. It should also be clear that these irregularities in the end product record adversely affect the tracking ability of the stylus of the reproducing cartridge so that the recorded sound played back through an amplifier will be noisy and/or distorted.

The present invention relates to an improved stylus for more readily cutting records with fewer surface irregularities and flaws. In accordance with the invention the stylus is provided with generally concave cutting edges. This provides easier entry of the stylus into the record material so that the record material forces do not cause as much shrinkage. Also, the concave cutting edges produce groove side walls on the master record which are more nearly straight or generally convex. Because of the relatively convex shape of the groove walls which results from the concave cutting edges of the stylus, the separation of the pressing blank from the master and also the separation of the end product records from the pressing blanks is easier and cleaner. The cleaner separation and the production of the more nearly symmetrical grooves without horns give rise to better tracking of the reproducing stylus and reproduction of sounds with a reduced amount of distortion and noise. In addition, in preferred embodiments of the invention the cutting face of the stylus has a scooped out or concave portion which further facilitates the cutting of the record and in cooperation with the curved cutting edges gives better cleavage of the record material with fewer surface irregularities and flaws.

The stylus of the present invention is preferably provided with one or more burnishing facets on the cutting edge thereof. These burnishing facets are used to polish the grooves of the record as it is being cut. It has been found that the use of these burnishing facets in combination with the other features of the stylus of the present invention is decidedly advantageous and produces excellent results in cutting a record.

It is therefore an object of this invention to provide an improved recording stylus.

A further object of the invention is to provide a recording stylus having cutting edges which are generally concave.

A further object of the invention is to provide a recording stylus having a cutting face which is scooped or dished out.

Still a further object of the invention is to provide a recording stylus in which the cutting face is scooped out and the cutting edges thereof are slightly concave in shape.

A further object of the invention is to provide a cutting face having concave cutting edges, provided with at least one burnishing facet.

Another object of the invention is to provide a recording stylus in which the cutting face is scooped out in a concave manner and the cutting edges thereof are also concave, the edges of the cutting face being provided with one or more burnishing facets to smooth the groove cut by the stylus.

Other objects and advantages of the present invention will become more apparent upon reference to the following specification and annexed drawings in which.

Figure 7:
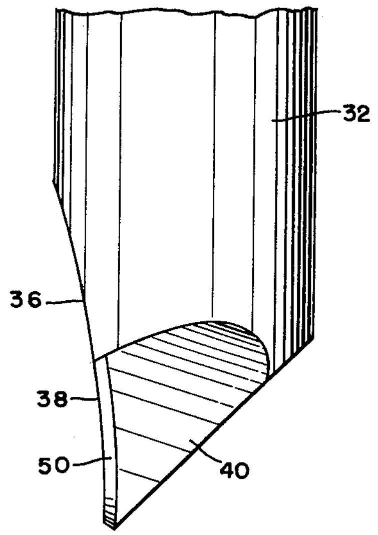
Figure 9:
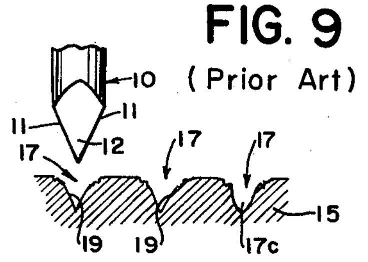
FIG. 9 (Prior Art)
Figures 8, 10:
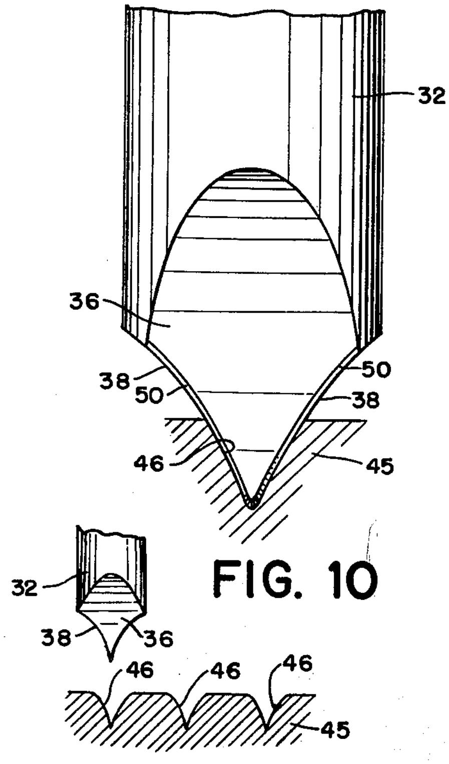
Figure 11:
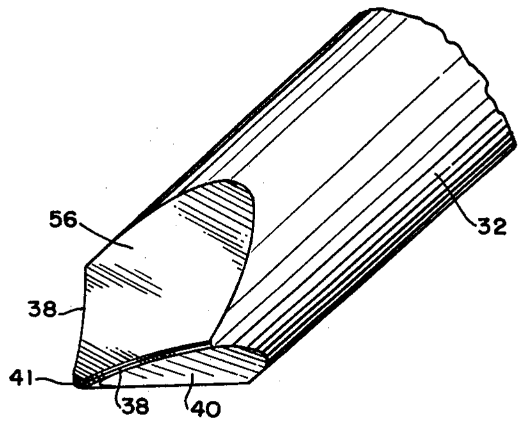

FIGURES 7 and 8 respectively show side and front elevational views of another embodiment of the invention;

FIGURES 9 and 10 are cross sections of the grooves cut by various types of styli; and FIGURE 11 is an enlarged perspective view of another embodiment of the invention.

Referring first to FIGURE 9 there is shown a cross section of a few grooves 17 of a record 15 which are cut by a prior art stylus 10 having a V-shaped cutting surface with V-shaped cutting edges 11 and a flat cutting face 12. The direction of the travel of the record 15 is into the paper so that material is cut from the record grooves by the flat cutting face 12 and the cutting edges 11. Due to the resistance of the record material to being cut and the forces therein, the grooves 17 will not have the exact V-shape as the cutting stylus. Instead, portions of the side wall 19 of the groove will be torn away as well as portions of the record material in the space between two adjacent grooves. These irregular portions give rise to what is called horns since when the material for the master pressing blank or matrix is poured over the master 15 the negative groove matrix of the master pressing blank will have the reverse of the irregular portions. These give rise to the same irregular surface shapes on the pressing blanks so that the end product records made from the pressing blanks will also eventually have the same irregularities as the master record 15.

By inspecting FIGURE 9 it can be seen that a problem arises in the separation of the pressing blank from the master and the separation of the end product records from the pressing blanks since the material in the irregularities in the groove wall and between grooves will tend to stick together to prevent separation. In some cases, the horns cause additional material to be torn away from the grooves of the end product records. Also, as the cutting edges of the stylus wear and become rounded, a groove having concave side walls is formed. This is shown in enlarged detail by the groove 17c of FIGURE 9. A concave groove is desirably avoided since it also adversely affects separation. Further, it is more difficult for a reproducing stylus to track in such a groove.

Figure 1:
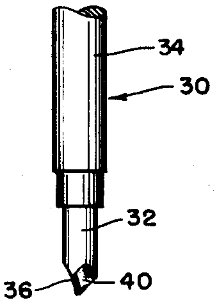
FIGURE 1 is a plan elevational view of one embodiment of the stylus made according to the present invention.
Figure 2:
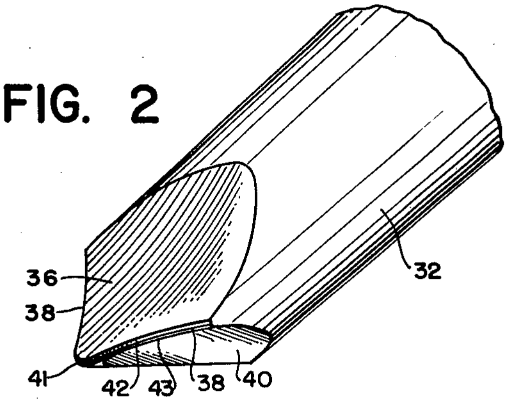
FIGURE 2 is an enlarged perspective view of a portion of the stylus of FIGURE 1.
Figure 3:
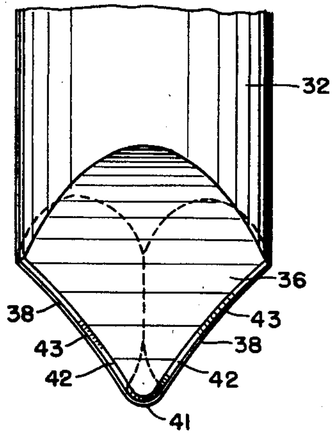
FIGURE 3 is an enlarged front view of the stylus of FIGURE 1.
Figure 4:
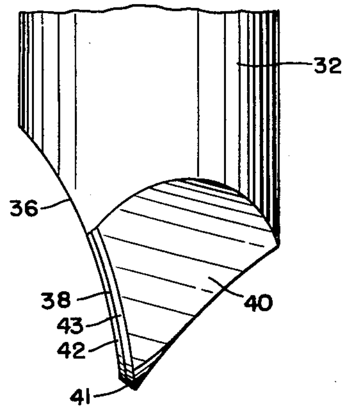
FIGURE 4 is an enlarged side elevational view of the stylus of FIGURE 1.
Figure 5:
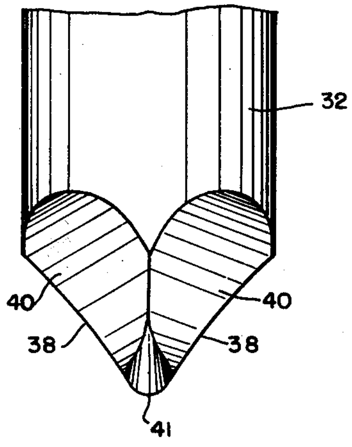
FIGURE 5 is an elevational view of the back of the stylus of FIGURE 1.
Figure 6:
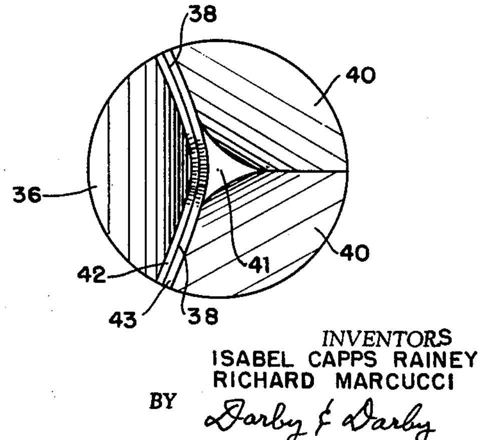
FIGURE 6 is a bottom view of the stylus of FIGURE 1.

Many of the disadvantages of the irregularities in the master record and subsequent pressing blanks and end product records are overcome by the stylus of the present invention an embodiment of which is shown in overall detail in FIGURE 1. Here, the stylus 30 is formed by a cutting rod 32 which is preferably made of synthetic material such as ruby or sapphire. The rod 32 is held by a shank 34 which is in turn held in a cutter head (not shown). If desired, the shank 34 is provided with heating wires in the conventional manner.

As shown most clearly in FIGURES 2 through 6, which are greatly enlarged views of the stylus of FIGURE 1, the lower end of cutting rod 32 is ground with a cutting face 36. Clearance faces 40 are also ground to provide a cutting edge 38 on each side of the face 36. The shape of the clearance faces 40 tapers the cutting face 36 down to the tip 41. Each of the cutting edges and the tip are also ground to have at least two burnishing facets 42 and 43 which are at different angles with respect to the cutting face 36. The general purpose of the burnishing facets is to polish the groove as it is cut in the record. This is more clearly described in the prior patents to F. L. Capps 2,187,512 and 2,530,284, which are assigned to the same assignee. It has been found that these burnishing facets work extremely well in cooperation with the type of grooves produced by the stylus of the present invention.

In accordance with the preferred embodiment of the invention shown in FIGURES 1–6, the cutting face 36 of the stylus is ground to be generally dished or scooped out to form a concave cutting surface. This is shown in greatly enlarged scale in FIGURE 2. Similarly, the clearance faces 40 are ground to produce cutting edges 38 which are also generally concave. This is shown in greatly enlarged detail in FIGURE 5. It should be clear that the burnishing facets 42 and 43 follow the contour of the cutting edges. Therefore, instead of having a flat cutting face and straight cutting edges, as in prior art styli, the stylus of FIGURES 1–6 has a concave cutting face with generally concave cutting edges.

When the stylus of FIGURES 2–6 is used to cut a groove, the groove will have side walls which tend to be generally convex. This is shown in FIGURE 10, which is a greatly magnified cross-section of several grooves of a record 45 cut by the stylus of FIGURES 2–6. It can be seen that each of the side walls 46 of the grooves is of generally convex shape due to the concavity of the cutting edges of the stylus. The shape of the groove side walls 46 is exaggerated over what occurs in practice in order to illustrate the principles of the invention.

The use of the scooped out face 36 and the curved cutting edges 38 gives the stylus of the present invention the ability to obtain better cleavage between the stylus and the record material as the stylus is cutting the grooves. First of all, the concave cutting edges 38 give better entry of the stylus into the surface of the record and give a cleaner cut. Also, the scooped face 36 gives a type of a snow-shovel effect in pushing the material cut from the record away from the tip of the stylus and up the scooped-out face to a position on top of the record where it can be blown or drawn away by a suitable blower or suction means. Because of the cleaner and better cleavage a record is produced which has fewer surface flaws and irregularities, such as horns, etc.

As is also seen in FIGURE 10, the curved cutting edges of the stylus form grooves in the record, with generally convex side walls. This shape is desirable since when material is poured into these grooves to make the negative matrix for the master pressing record or when the pressing blanks are covered with material to make the end product record, the two will be more easily separated. The ease of separation is also enhanced due to the reduction of surface irregularities and flaws.

FIGURES 7 and 8 show another embodiment of the invention in which only a single burnishing facet 50 is provided on each concave cutting edge 38. Again, the scooped-out or generally concave face 36 is provided. The shape of the groove 46 cut in the record 45 is shown in FIGURE 10. While this single burnishing facet does provide some degree of groove polishing it is preferred that two or more burnishing facets be used. As many burnishing facets as desired can be used as is consistent with the grinding and size of the stylus.

The cutting edges 38 for the stylus, as well as the scooped face 36, can be ground in either the horizontal or vertical plane depending upon the cutting angle of the face 36 desired for use in cutting different material and the record material itself. By this it is meant that the cutting wheels used to grind the stylus are rotated in either the horizontal or the vertical plane with respect to the end of the stylus.

In recent literature mention has been made of the use of a cutter head which is mounted at an angle with respect to the arm or spindle of the cutting machine so that a desired modulation slant can be obtained in the record, as is consistent with standards set by the industry. It should be clear that the cutting face 36 may be ground on the stylus of the invention at any desired angle $\alpha$ (FIGURE 6) so that when the stylus is mounted in a cutting head, which is in turn mounted at an angle, the face 36 of the stylus will be substantially perpendicular or at any desired angle to the top surface of the record as the stylus cuts into the record. The angle $\alpha$ is measured by the intersection of the plane of the cutting face 36 with the cylindrical rod 32 and it may be, for example, anywhere from 5° through 30°. All of the angles in this range have given good results. Of course, other angles of less or more than 30° may be utilized as is required for different types of record materials, cutting heads and/or modulation slants.

It should also be clear that the curvature of the scooped face 36 may be made as desired. Particularly good results have been obtained using grinding wheels with a radius in the range of .140 inch to .375 inch to make the scooped face. Of course cutting wheels of greater or smaller radii may be used to obtain a correspondingly smaller or larger curvature for the scooped face and wheels having radii in the range from .062 to 1.5 inches have been used to produce the styli. Also, the amount of concavity of the stylus cutting edges can be varied as desired within practical limits.

FIGURE 11 shows still another embodiment of this invention in which the stylus is again provided with the concave cutting edges 38 to produce the grooves having generally convex side walls. Here, however, the cutting face 56 is made flat which could be done by using a cutting wheel of a radius of 1.5 inches or larger. While the flat face reduces the ease of cleavage of the record material to a small extent the concave cutting edges still give a much cleaner cut than is produced by straight cutting edges. Here, again, two burnishing facets are shown, although any desired number may be provided. Also, the cutting face 56 may be swept back at any desired angle $\alpha$ to accommodate different types of cutting heads, record material and modulation slants.

Therefore it can be seen that a stylus has been provided which achieves desirably advantageous results in cutting the records by the elimination of a substantial number of surface irregularities or flaws which were brought about by the prior art styli. Because of the concave shape of the cutting edges of the stylus and the concave cutting face considerably better cleavage of the material is obtained. This reduces surface irregularities and makes the end product record quieter. Also, the generally convex side walls of the grooves on the master give rise to better separation between the master and the pressing blanks as well as better separation of the end product records and the pressing blanks. It should also be obvious that while a flat type disc record has been shown that the stylus of the present invention may be used on cylindrical discs and also to produce cylindrical end product records having the grooves with relatively convex shaped side walls.

What is claimed is:

1. A recording stylus for cutting grooves in a record, said stylus having a generally concave cutting face, generally concave cutting edges bounding said cutting face on at least two sides thereof, and at least one burnishing facet on each said generally concave cutting edge.

2. A recording stylus assembly for cutting the grooves of a record comprising a rod of cutting material, said rod having a cutting face at an end thereof, said cutting face having edges forming a generally V-shaped configuration with the edges being generally concave, the front surface of the cutting face also being generally concave and at least one burnishing facet on each said edge.

3. A recording stylus assembly as set forth in claim 2 wherein the front surface of the cutting face makes an angle in the range from about 5° to 30° with the outer surface of the rod.

4. A recording stylus assembly as set forth in claim 2 wherein the front surface of the cutting face has a radius of curvature in the range from about .140 to .375 inch.

References Cited by the Examiner

UNITED STATES PATENTS

| | | | |
|---|---|---|---|
| 1,312,848 | 8/19 | Hunt | 274—38 |
| 1,966,873 | 7/34 | Sochor | 274—38 X |
| 2,094,201 | 9/37 | Bender | 274—38 |
| 2,187,512 | 1/40 | Capps | 274—38 |
| 2,310,049 | 2/43 | Albersheim | 274—38 X |
| 2,530,284 | 11/50 | Capps et al. | 274—38 |
| 2,950,116 | 8/60 | Goldmark | 274—46 |

NORTON ANSHER, *Primary Examiner.*